May 23, 1961        R. A. HILL        2,984,986

AUTOMATICALLY CONTROLLED HYDRAULIC GATE AND GATE CONTROL

Filed Dec. 6, 1957        3 Sheets-Sheet 1

RAYMOND A. HILL
INVENTOR.

BY

ATTORNEY

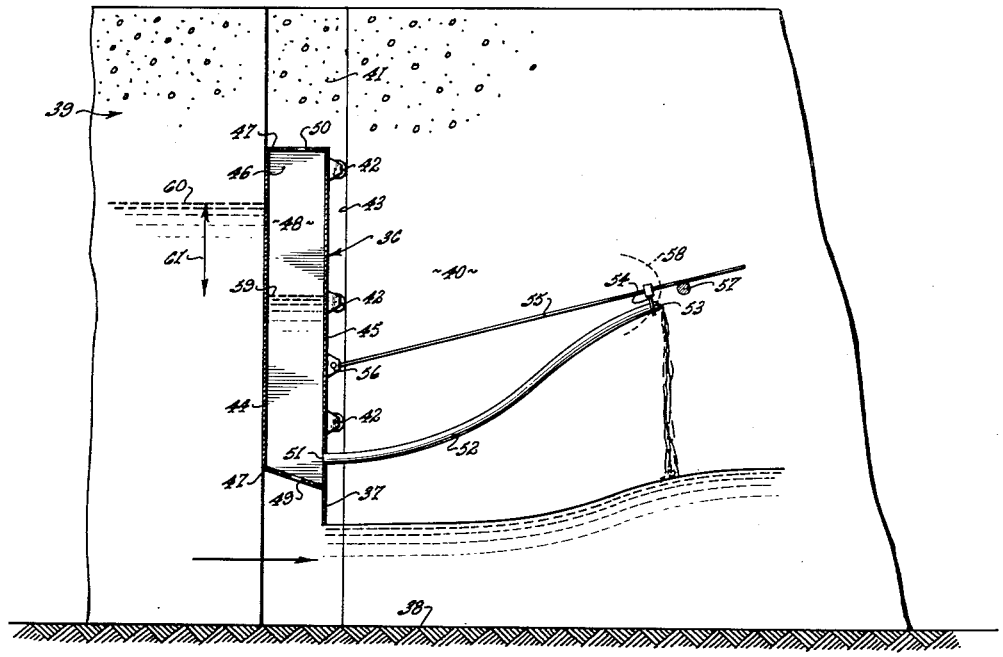

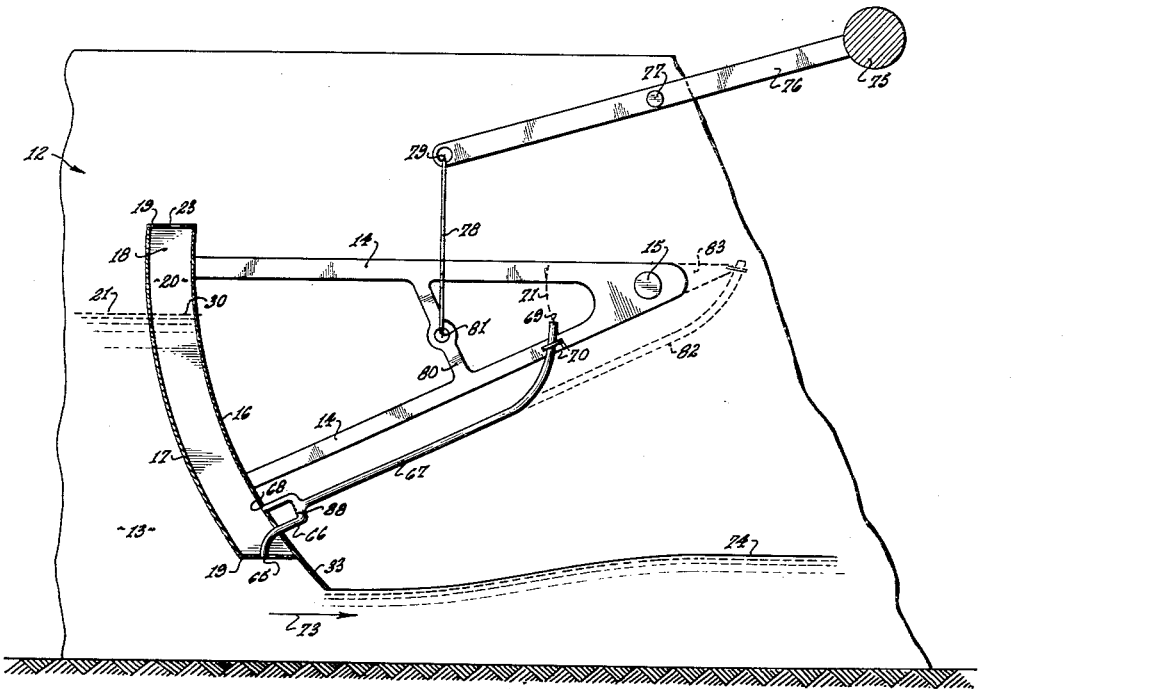

United States Patent Office 2,984,986
Patented May 23, 1961

2,984,986

AUTOMATICALLY CONTROLLED HYDRAULIC GATE AND GATE CONTROL

Raymond A. Hill, 660 S. Orange Grove Ave., Pasadena, Calif.

Filed Dec. 6, 1957, Ser. No. 701,137

8 Claims. (Cl. 61—28)

This invention relates generally to improvements in the automatic control by hydraulic means of gates and gate systems used on spillways from reservoirs, for the diversion of water from rivers, and for control of water levels in canals. More particularly, this invention is directed to the opening and closing of such gates in accordance with a predetermined relation between the amount of gate opening and the upstream water level without the use of auxiliary floats, variable counterweights, or similar devices.

Positive automatic control of gate openings by hydraulic means has heretofore been made possible only by auxiliary devices which changed the water level in wells wherein counterweights were suspended, such devices being effective but necessarily complicated and expensive. Other forms of automatic hydraulic controls of such gates are used which do not involve auxiliary floats or variable counterweights, but these are limited in their application to the maintenance of a constant upstream water level. Gates equipped with such control devices are unstable because the gates tend to open to the fullest extent in response to any rise in the upstream water level and to close completely for any lowering of the upstream water level. Positive control, on the other hand, requires that there be a definite relation between the upstream water level and the gate opening. This requires that for any upstream water level the forces tending to open the gate and the forces tending to close the gate must be in equilibrium at only one corresponding position of the gate, this requirement being satisfied in the manner described below.

According to the present invention, a flotation chamber large enough to minimize the effect of frictional forces is carried at the upstream face of any undershot gate designed to control the flow of water typically over a spillway, through a sluiceway at diversion works, in a canal, or other channel carrying water. The flotation chamber being attached to or integrally constructed with the gate, it moves up or down therewith, an inlet to the flotation chamber being provided so that water can enter the chamber from the reservoir or other body of water upstream from the gate. There is also an outlet from the flotation chamber communicating with the inlet end of a conduit connected to the gate, or to a linkage that moves with the gate, the downstream end of the conduit being open for controlling the maximum water level inside the flotation chamber. Provision is made for adjustment of the position of the outlet or discharge end of the conduit so as to permit establishment of any desired relation between the maximum water level in the flotation chamber and the amount of the gate opening.

A gate so equipped operates essentially as follows, assuming that upstream water may flow into the flotation chamber to maintain the surface level therein equal to the rising upstream surface level. The gate will first be in its closed position, and as the upstream water level rises water will flow into the flotation chamber, but will not at first flow out because the downstream end of the outlet conduit will be higher than the rising water level in the chamber. As the upstream water level continues to rise, the water level in the flotation chamber will rise until it reaches the elevation of the discharge end of the outlet conduit. Assuming that the gate is not fully counterbalanced, the upstream water level will then rise further, without any accompanying change in the water level in the flotation chamber, until the buoyant force produced by the difference between the upstream water level and the water level in the chamber and exerted on the gate equals the gravity forces tending to hold the gate closed. Any further rise in the upstream water level will then produce excess buoyant force, causing the gate to open and pass some of the incoming upstream water under the gate.

In the absence of an outlet from the flotation chamber, the gate would then tend to open only to the same extent as the rise in the upstream water level. However, by reason of the presence of the outlet conduit, the water level in the flotation chamber cannot rise above the level of the discharge end thereof. Hence, any further rise in the upstream water level will produce an unbalanced buoyant force causing the gate to open progressively until the flow of water under the gate equals the inflow into the approach channel and the forces tending to move the gate are in equilibrium. This position of equilibrium corresponds to an upstream water level high enough above the water level in the flotation chamber to produce buoyant forces exactly balancing the gravity forces exerted on the gate, with the water level in the flotation chamber at the level of the discharge end of the outlet conduit, which level differs from the closed position by the amount of upward movement of the downstream end of the outlet conduit predetermined by the point of attachment of this conduit to the gate.

Subsequent reduction in the rate of flow in the approach channel would tend to cause a lowering of the upstream water level and a reduction of the buoyant force exerted on the gate. The latter would then start to close under the unbalanced gravity force, and it would continue to close until equilibrium was again established when the level of the water in the flotation chamber, controlled by the position of the downstream end of the outlet conduit, became enough lower than the water level in the channel upstream from the gate to create buoyant forces equal to the gravity forces.

The predetermined relationship between gate opening and rise in upstream water level will depend upon circumstances. In the case of gates used in canals as checks to maintain water levels suitable for diversion of water out of those canals, small fluctuations in the upstream level would be permissible, such levels being sensitive to the amount of gate opening. Thus, canal gates might come almost fully open for a rise of perhaps only one foot in the upstream water level. On the other hand, provision must be made for substantial increases in upstream water level relative to the amount of opening of gates on spillways from a reservoir to ensure against sudden changes in the rate of outflow through the spillway with attendant risks to life and property. A typical relationship between gate opening and the rise in the level of reservoir water would be:

| Gate Opening, Feet | Rise in Upstream Water Level, Feet |
|---|---|
| 0 | 0 |
| 2.0 | 1.0 |
| 5.0 | 2.0 |
| 10.0 | 3.0 |
| 20.0 | 5.0 |

As stated previously, the above brief discussion of gate operation is based on the assumption that upstream water may initially flow into the flotation chamber at such rates under all conditions as to maintain the surface level in the chamber equal to the upstream surface level rising toward the level of the discharge conduit outlet. If, on the other hand, water flow rates into the chamber are insufficient initially to maintain equality of water surface levels in the chamber and upstream, as for example due to a very rapid rise in upstream level, then the gate will act in the beginning as a floating body after sufficient buoyant force develops to float the gate.

The invention further contemplates the inclusion of valves to throttle the inflow and outflow from the flotation chamber so as to provide any desired degree of sensitivity. It also includes the use of a check valve in the inlet from the upstream channel or reservoir to the flotation chamber whenever it would be desirable or necessary to prevent water flowage from the flotation chamber back into the approach channel or reservoir. This check valve would customarily be used in the control of fully balanced gates.

These and other objects and advantages of the invention will be more fully understood from the following detailed description of the drawings, in which:

Fig. 3 is a schematic section of a vertical lift gate to which the invention is applied;

Fig. 4 is a plan view of the Fig. 3 gate;

Fig. 5 is a schematic section of a counterbalanced radial gate; and

Fig. 6, in three parts, 6a, 6b and 6c, shows schematically the piping connections for the flow of water into and out of the flotation chamber of Fig. 5.

Figure 1:
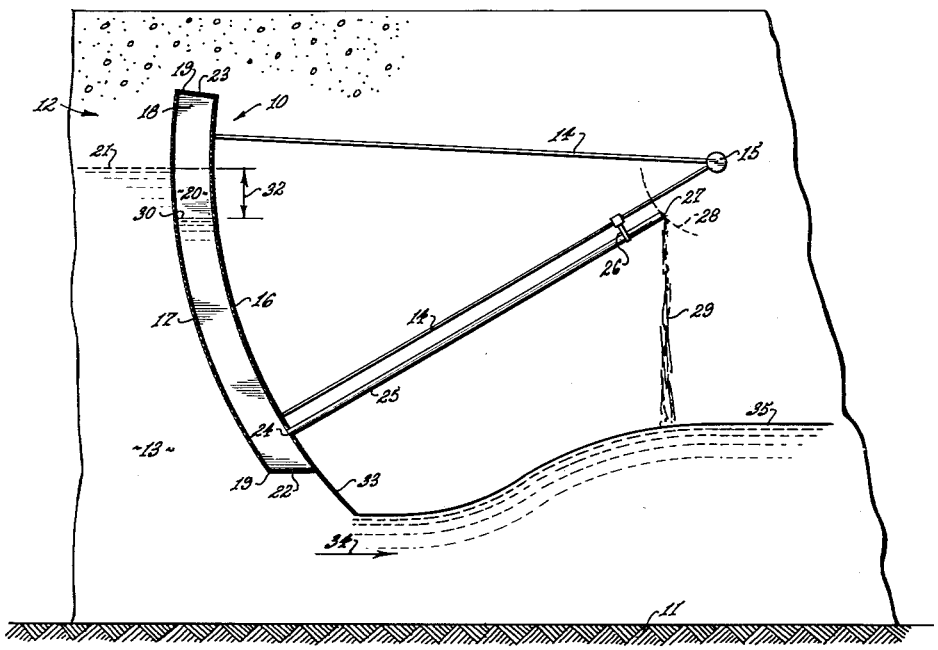
Fig. 1 is a schematic section of a simple radial gate incorporating the principles of the invention.
Figure 2:
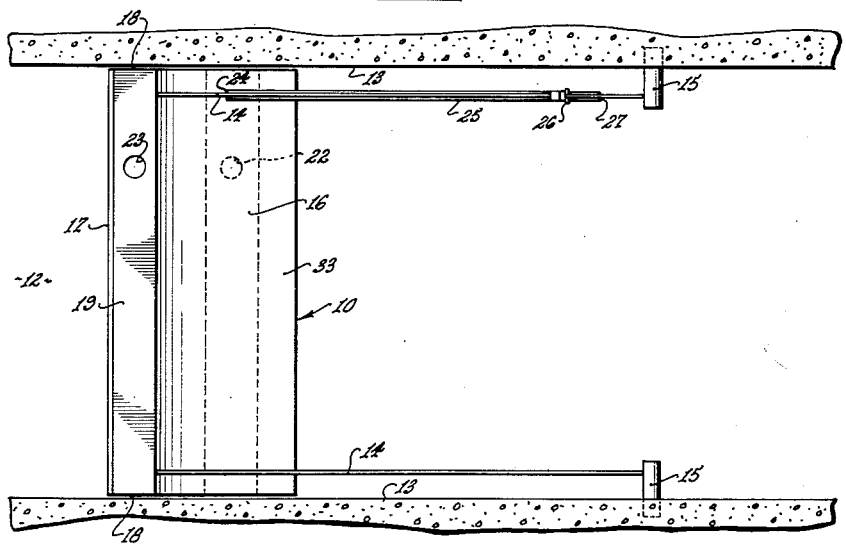
Fig. 2 is a plan view of the Fig. 1 gate.

Referring first to Figs. 1 and 2, the radial gate 10 is shown in partially open position above the floor 11 of channel 12, the gate extending across the width of the channel between side walls 13. Radially extending gate arms 14 are supported on trunnions 15 mounted in the channel side walls, as shown, so as to accommodate gate rotation in generally upward and downward directions in the channel.

The radially spaced inner and outer gate face panels 16 and 17 extending in circular arcs, together with suitable closures 18 at transverse opposite ends of the gate and top and bottom closures 19 form a flotation chamber 20 extending above and below the water surface 21 upstream of the gate.

It is contemplated that chamber forming panels 17, 18 and 19 may be joined to an ordinary gate face panel 16, as by welding, to readily convert the gate to the chambered type for operation in accordance with the principles of the invention. Upstream water is admitted to the lower portion of the flotation chamber through an inlet 22 in the bottom closure 19, and air in the chamber escapes through opening 23 above upstream surface level 21. Water flows out of the flotation chamber through outlet 24, and then through a conduit 25, the length of which may be adjusted as by providing a flexible conduit and moving the conduit support 26 along arm 14 so as to displace the downstream or discharge open end 27 of the conduit toward or away from the axis of gate rotation. During such rotation, the end 27 of the supported conduit moves along the arc indicated at 28, varying the level at which water may freely discharge from the conduit, as indicated at 29. The support 26 is preferably adjustable to move the conduit outlet end 27 vertically and/or horizontally relative to the chamber so that the range and rate of travel of the outlet 27 relative to the gate can be varied at will.

The water level 30 inside the flotation chamber is controlled by the elevation of the downstream end 27 of the conduit 25, level 30 being only that amount higher than the elevation of conduit end 27 required to overcome frictional losses in the flow of water through outlet 24 and conduit 25. The buoyant force exerted on the gate and required to overcome the weight thereof is equal to the product of the vertical distance 32 between water levels 21 and 30, the radial dimension of chamber 20, the transverse length dimension of the chamber between closures 18 and the unit weight of water. In other words, the buoyant force equals the weight of water that would completely fill the chamber volume between levels 21 and 30. The upstream water level 21, for each condition of gate equilibrium, is at some height above the water level 30 in the flotation chamber, and under this condition of equilibrium upstream water passes through the opening under the gate extension 33, as indicated by the arrow 34, and producing a downstream surface level 35 in the channel.

It will be observed that the effective outflow level from the flotation chamber is determined by the position of the downstream end 27 of the outlet conduit 25, and that position is dependent upon the degree or amount of gate opening; the water surface level 30 in the flotation chamber is in turn dependent on the elevation of the conduit outlet end 27, and the elevation of the upstream water surface 21, for each condition of equilibrium must be at same height 32 above level 30 in the flotation chamber. Consequently, the amount of gate opening and the upstream water level are interdependent, and for each upstream water surface level there can be only one position of the gate at which the buoyant force exerted on the gate and produced by displacement of upstream water can exactly balance the gravity forces tending to close the gate, assuming that upstream water may initially flow into the flotation chamber to maintain the surface level therein equal to the rising upstream surface level.

Referring now to Figs. 3 and 4, a vertical lift gate 36 is shown as partially open, typical guides, counterweights and other devices used in conjunction with such a gate having been omitted. In the gate down position, extension 37 would seat in floor 38 of channel 39, the gate closing the transverse interval between channel side walls 40. During up and down gate movement on guides in side wall recesses 41, the gate rollers 42 bear against vertical tracks 43 in those recesses. Upstream and downstream gate face panels 44 and 45 together with suitable closures 46 at transverse opposite ends of the gate and top and bottom closures 47 form the flotation chamber 48. Upstream water is admitted to the lower portion of the flotation chamber through inlet 49 in bottom closure 47, and air in the chamber escapes through opening 50 in the top closure.

Water flows out of the flotation chamber through outlet 51, and then through an adjustable length, typically flexible, conduit 52. While rather elaborate means would normally be provided in practice to cause the discharge end 53 of the conduit 52 to move with respect to the gate and in a predetermined path, for purposes of illustration the conduit outlet end is shown as simply attached by adjustable hanger 54 to an arm 55 hinged to the gate at 56, the free end portion of the arm resting on and being slidable over pin 57 projecting from the channel side wall 40. With this arrangement, the discharge end 53 of conduit 52 will follow a curved path indicated by the broken line at 58 during raising and lowering of the gate.

Here again the water level 59 in the flotation chamber is controlled by the elevation of the conduit end 53, and the buoyant force required to overcome gravity forces on the gate equals the weight of water that would completely fill the chamber volume between upstream surface level 60 and the surface level 59 in the chamber. Therefor, for each condition of equilibrium, the upstream water surface level is at some fixed distance 61 above the water surface level in the flotation chamber.

It is again to be observed that any rise in upstream water level 60 will produce an unbalanced buoyant force tending to open the gate and conversely that any lowering of the upstream water level will reduce the buoyant force and tend to close the gate, the gate coming to rest in either case when the buoyant force created by the difference in water surface levels 59 and 60 inside and upstream of chamber 48 exactly balances the gravity forces tending to close the gate. In any event, the position of outlet end 53 of conduit 52 is determined by the amount of gate opening; the water surface level 59 can rise no higher than the level of outlet 53 plus a small distance corresponding to frictional losses arising from flow through outlet 51 and conduit 52; and the water level 60 upstream of the gate must be, for equilibrium, at a height above level 59 sufficient to provide buoyant forces exactly balancing downward gravity forces exerted on the gate. Therefor, the gate opening and upstream water surface level are mutually interdependent, and there is a one-to-one correspondence therebetween.

Referring now to Fig. 5, there is shown a typical radial gate that is fully counterbalanced, the elements corresponding to those illustrated in Figs. 1 and 2 being given the same numbers. Here, water flows into the flotation chamber through inlet 65, and pipe 66 connected into conduit 67. Water flows out of the chamber through outlet 68 and the conduit 67, which is adjustable in length and typically flexible, as before. The downstream end 69 of the conduit is adjustably attached at 70 to the arm 14, constraining the end 69 to move along the path indicated at 71 as the gate opens or closes.

The water level 30 in the flotation chamber is controlled by the elevation of the end 69 of the outlet conduit 67, and level 30 is above level 69 only by the small amount required to overcome friction in the flow of water through outlet 68 and conduit 67. Since the radial gate is fully counterbalanced, no buoyant force is required for equilibrium, so that the upstream surface level 21 is the same as the level 30 in the flotation chamber. Water flowing under the gate as shown by the arrow 73 is productive of a downstream water level such as that indicated at 74.

While counterbalancing of the radial gate might be accomplished by extending arms 14 and providing a fixed counterweight, it is more convenient to support the counterweight separately as shown in Fig. 5. Here the counterweight 75 is attached to one end of a lever arm 76 fulcrumed at trunnion 77, a separate link 78 being hinged to the opposite end of the arm 76 at 79 and to the gate arm brace 80 at 81. Essential to this means of counterbalancing is the provision that the arm 76 extend parallel to a line between the gate trunnion 15 and the point of attachment at hinge 81.

Where the Fig. 5 gate is not fully counterbalanced, the conduit 67 can be extended as indicated by broken lines 82, and supported by a gate arm extension 83 so that the outlet end of the conduit is relatively downstream of the axis of gate rotation. As a result, the outlet 69 will move downward as the gate opens upwardly and the gate consequently will tend to open more rapidly, the upstream water surface level being then dependent upon the flow of water under the gate, which is in turn dependent upon the amount of gate opening. Such an arrangement would be particularly applicable to a canal gate where any opening of the gate would produce rapid lowering of the upstream water level, and vice versa.

Reference is now made to Figs. 6a, 6b and 6c showing a typical arrangement of the piping provided for operation of the fully counterbalanced gate of Fig. 5. Fig. 6a shows the inlet 65 from the upstream body of water; Fig. 6b shows the outlet 68 from the flotation chamber; and Fig. 6c shows the piping communication with inlet 65, outlet 68 and the conduit 67. Inlet 65 communicates with pipe 66 extending to the downstream side of the gate, and outlet 68 communicates with pipe 87 also at that gate side. One end of a connecting pipe 88 communicates with pipe 66 through series connected throttling and check valves 90 and 91, while the other end of pipe 88 communicates with pipe 87 through a throttling valve 92. The check valve is provided so that water cannot flow from the flotation chamber back through pipe 66 into the upstream reservoir.

The radial gate shown in Fig. 5 being fully counterbalanced, the water level 21 upstream of the gate, water level 30 within the flotation chamber and the end 69 of the outlet conduit would all be at the same elevation except for small differences required to overcome friction. These differences would be substantially constant for any position of the gate so that for all practical purposes they may be disergarded. Any rise in the upstream water level 21 would produce an unbalanced buoyant force equal to the difference in elevation between water level 21 and water level 30 multiplied by the width and by the length of the flotation chamber and by the unit weight of water. This unbalanced buoyant force would then tend to open the gate. This opening of the gate would raise water level 30 were it not for flow through outlet 68 and conduit 67. As the radial gate opens, water drains out of the flotation chamber maintaining a level equal or, because of hydraulic friction, slightly above the end 69 of the outlet conduit. Such withdrawal of water from the flotation chamber then forces the gate to open further until end 69 of the outlet conduit comes up to the level 21 upstream from the gate. A new condition of equilibrium is then reached, in which a sufficient gate opening is automatically provided to maintain the upstream water level at the desired level to the gate opening.

At the time of any subsequent lowering of water level 21, the buoyant force is reduced, but because of the check valve between pipes 66 and 88 the water in the flotation chamber cannot drain out. An unbalanced downward force equal to the weight of water in the flotation chamber between water level 30 and the reduced water level 21 is thereby created, forcing the gate to move downward. As it moves downward some of the water in the flotation chamber flows out through outlet 68 and conduit 67 because end 69 has likewise lowered. The downward movement will therefore continue until outlet end 69, water level 30 in the flotation chamber, and upstream water level 21 are again the same and a new condition of equilibrium is thus reached.

Referring again to Fig. 6, the rate of inflow to the flotation chamber can be controlled at will by opening or by throttling valve 90, and the rate of flow out of the flotation chamber can be controlled by throttling valve 92. In this manner the rapidity of response of the gate to changes in upstream water level can be controlled to the degree found desirable in actual operation.

It is to be observed that in each case described above there can be no tendency for the gates to overrun or oscillate up and down. In the case of the unbalanced radial gate and in the case of the unbalanced lift gate, a certain differential between the upstream water level and the water level in the flotation chamber is required to provide sufficient buoyant force to overcome the gravity forces. In the case of the counterbalanced radial gate, and the same would be true with respect to a counterbalanced vertical lift gate, this differential in water levels becomes nominal. Should, for example, due to frictional drag or any other cause, the upstream water level rise one foot above the previous equilibrium level, the increased buoyant force would tend to open any of the gates described or any other gate similarly equipped. However, this force would diminish progressively as the gate opened and become zero by the time the gate had opened one foot, the assumed sudden rise in the upstream water level. There would be no force present tending to cause the gate to move beyond that position. The same would be true in event of a sudden lowering of the upstream water surface without corresponding movement of the gate due to friction or any other cause. Any of the gates described or any other gate similarly equipped would, when freed, tend to move downward by an amount equal to the lowering of the upstream water level, and there would be no force present to cause any further downward movement.

In every case a new condition of equilibrium would be established, determined by the interdependence between the elevation of the end of the outlet conduit from the flotation chamber and the elevation of the upstream water surface. The elevation of the downstream end of the outlet conduit being controlled by the position of the gate itself, the amount of gate opening and the upstream water surface are mutually interdependent and have one-to-one correspondence. Thus, the gate remains in equilibrium at any of an infinite number of different gate elevations respectively corresponding to an infinite number of different upstream water surface levels.

I claim:

1. A self-regulating hydraulic gate assembly controlling the downstream flow of water in a flow way, comprising gate means including a chamber bodily movable up and down in the flow way variably to displace water at the upstream side of the gate, said chamber having an inlet through which upstream water is directly receivable into the chamber, the surface levels of water in the chamber and upstream of said gate being substantially equal, said chamber being subjected to static hydraulic force exerted thereon as a result of said displacement of upstream water by the chamber and water reception therein, and conduit means communicating with the chamber interior for receiving chamber water, said conduit means having a water discharge outlet bodily movable up and down downstream of the chamber in response to said gate up and down movement for controlling the surface level of water in said chamber, the entirety of said conduit means being carried by said bodily movable gate means so as to be bodily movable therewith, whereby said gate is movable up and down in response to raising and lowering of the upstream water surface level so as to remain in equilibrium at any of an infinite number of different gate elevations respectively corresponding to an infinite number of different upstream water surface levels, and means downstream of said chamber counterbalancing the gate to maintain the surface levels of water in said chamber and upstream of said assembly substantially equal.

2. A self-regulating hydraulic gate assembly controlling the downstream flow of water in a flow way, comprising gate means including a chamber bodily movable up and down in the flow way variably to displace water at the upstream side of the gate, said chamber having an inlet through which upstream water is directly receivable into the chamber, said chamber being subjected to static hydraulic force exerted thereon as a result of said displacement of upstream water by the chamber and water reception therein, and piping means including a conduit communicating with the chamber interior for receiving chamber water, said conduit having an openly exposed water discharge outlet bodily movable up and down downstream of the chamber in response to said gate up and down movement for controlling the surface level of water received in said chamber, the entirety of said conduit means being carried by said bodily movable gate means so as to be bodily movable therewith, whereby said gate is movable up and down in response to raising and lowering of the upstream water surface level so as to remain in equilibrium at any of an infinite number of different gate elevations respectively corresponding to an infinite number of different upstream water surface levels, the top surface level of the water in said chamber being substantially equal to the elevation of the discharge outlet at each of said different elevations of the gate in equilibrium, said piping means communicating with the upstream side of the gate, throttle valve means in said piping means operative to control the rate of water flow therein, and check valve means in said piping operative to prevent water flow therein from the chamber to the upstream side of the gate, and means counterbalancing the gate.

3. A self-regulating hydraulic gate assembly controlling the downstream flow of water in a flow way, comprising gate means including a chamber bodily movable up and down in the flow way variably to displace water at the upstream side of the gate, said chamber having an inlet through which upstream water is directly receivable into the chamber, said chamber being subjected to static hydraulic force exerted thereon as a result of said displacement of upstream water by the chamber and water reception therein, and piping means including a conduit communicating with the chamber interior for receiving chamber water, said conduit having an openly exposed water discharge outlet bodily movable up and down downstream of the chamber in response to said gate up and down movement for controlling the surface level of water received in said chamber, the entirety of said conduit being carried by said bodily movable gate means so as to be bodily movable therewith, whereby said gate is movable up and down in response to raising and lowering of the upstream water surface level so as to remain in equilibrium at any of an infinite number of different gate elevations respectively corresponding to an infinite number of different upstream water surface levels, the top surface level of the water in said chamber being substantially equal to the elevation of the discharge outlet at each of said different elevations of the gate in equilibrium, and means connected with the conduit for adjusting the location of said discharge outlet relative to the chamber so that said outlet will move a predetermined distance relative to and in response to said gate movement.

4. A self-regulating hydraulic gate assembly controlling the downstream flow of water in a flow way, comprising gate means including a chamber bodily movable up and down in the flow way variably to displace water at the upstream side of the gate, said chamber having an inlet through which upstream water is directly receivable into the chamber, said chamber being subjected to static hydraulic force exerted thereon as a result of said displacement of upstream water by the chamber and water reception therein, and piping means including a conduit communicating with the chamber interior for receiving chamber water, said conduit having an openly exposed water discharge outlet bodily movable up and down downstream of the chamber in response to said gate up and down movement for controlling the surface level of water received in said chamber, the entirety of said conduit being carried by said bodily movable gate means so as to be bodily movable therewith, whereby said gate is movable up and down in response to raising and lowering of the upstream water surface level so as to remain in equilibrium at any of an infinite number of different gate elevations respectively corresponding to an infinite number of different upstream water surface levels, and means supporting said conduit for up and down movement of said discharge outlet less than that of said chamber, whereby said gate up and down movement is relatively greater than movement of said discharge outlet.

5. The invention as defined in claim 4 in which said conduit support means comprises an arm having an axis of rotation downstream of the gate and supporting the gate for up and down movement about said axis.

6. The invention as defined in claim 5 in which said discharge outlet is relatively upstream of said axis.

7. The invention as defined in claim 5 in which said discharge outlet is relatively downstream of said axis.

8. The invention as defined in claim 4 in which said gate is movable up and down in a substantially vertical plane, and said conduit support means is pivotally connected with the gate.

References Cited in the file of this patent

UNITED STATES PATENTS

| 1,166,991 | Jones | Jan. 4, 1916 |
| 2,207,479 | Danel | July 9, 1940 |
| 2,699,652 | Laszlo | Jan. 18, 1955 |

FOREIGN PATENTS

| 747,149 | Great Britain | Mar. 28, 1956 |